United States Patent
Foti et al.

(10) Patent No.: US 11,115,842 B2
(45) Date of Patent: Sep. 7, 2021

(54) SYSTEMS AND METHODS FOR OPTIMIZED SIGNALING FOR NON IP DATA DELIVERY (NIDD) COMMUNICATION

(71) Applicant: Telefonaktiebolaget LM Ericsson (publ), Stockholm (SE)

(72) Inventors: George Foti, Dollard des Ormeaux (CA); Venkata Sameer Kumar Kodukula, Uttar Pradesh (IN); Nipun Sharma, New Delhi (IN); Aditya Kumar Sinha, New Delhi (IN)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 22 days.

(21) Appl. No.: 16/621,099

(22) PCT Filed: Jun. 13, 2017

(86) PCT No.: PCT/IB2017/053513
§ 371 (c)(1),
(2) Date: Dec. 10, 2019

(87) PCT Pub. No.: WO2018/229528
PCT Pub. Date: Dec. 20, 2018

(65) Prior Publication Data
US 2020/0280865 A1    Sep. 3, 2020

(51) Int. Cl.
*H04W 4/00*   (2018.01)
*G08C 17/00*  (2006.01)
(Continued)

(52) U.S. Cl.
CPC ............. *H04W 24/04* (2013.01); *H04W 4/70* (2018.02)

(58) Field of Classification Search
CPC ................................ H04W 24/04; H04W 4/70
(Continued)

(56) References Cited

U.S. PATENT DOCUMENTS

| 6,229,985 B1 * | 5/2001 | Arai ...................... H04M 1/733 455/428 |
| 2009/0117852 A1 * | 5/2009 | Loh ....................... H04W 24/04 455/67.11 |

(Continued)

OTHER PUBLICATIONS

Author Unknown, "Technical Specification Group Services and System Aspects; General Packet Radio Service (GPRS) enhancements for Evolved Universal Terrestrial Radio Access Network (E-UTRAN) access (Release 13)," Technical Specification 23.401, Version 13.10.0, 3GPP Organizational Partners, Mar. 2017, 375 pages.

(Continued)

*Primary Examiner* — Mark G. Pannell
(74) *Attorney, Agent, or Firm* — Withrow & Terranova, PLLC

(57) ABSTRACT

Systems and methods are disclosed herein that relate to deferring delivery of non-Internet Protocol (IP) data in a wireless communication system via a Non-IP Data Delivery (NIDD) procedure based on a power source status of a serving Radio Access Network (RAN) node of a target wireless device. In some embodiments, a method of operation of a network node comprises receiving, from an exposure function, a NIDD request comprising data from an application server to be delivered to a wireless device via a NIDD procedure. The method further comprises making a determination as to whether to deliver the data to the wireless device via the NIDD procedure based on a power source status of a RAN node associated with the wireless device. In this manner, delivery of the non-IP data can be deferred depending on the power source status of the RAN node.

16 Claims, 11 Drawing Sheets

(51) Int. Cl.
    *H04W 24/04* (2009.01)
    *H04W 4/70* (2018.01)

(58) Field of Classification Search
    USPC .......................................................... 370/328
    See application file for complete search history.

(56) References Cited

U.S. PATENT DOCUMENTS

| | | | | |
|---|---|---|---|---|
| 2012/0082099 | A1* | 4/2012 | Bienas | H04W 74/008 |
| | | | | 370/329 |
| 2012/0163265 | A1* | 6/2012 | Kotecha | H04W 74/006 |
| | | | | 370/312 |
| 2013/0012212 | A1* | 1/2013 | Murakami | H04W 36/00835 |
| | | | | 455/439 |
| 2014/0119260 | A1* | 5/2014 | Eriksson | H04W 76/28 |
| | | | | 370/311 |
| 2015/0341803 | A1* | 11/2015 | Kim | H04W 72/0453 |
| | | | | 370/252 |
| 2016/0043814 | A1* | 2/2016 | Bishop | H04B 17/10 |
| | | | | 370/242 |
| 2018/0368202 | A1* | 12/2018 | Landais | H04W 4/70 |
| 2019/0364492 | A1* | 11/2019 | Azizi | H04W 52/0264 |
| 2020/0379548 | A1* | 12/2020 | Dupree | G06F 1/305 |

OTHER PUBLICATIONS

Author Unknown, "Technical Specification Group Services and System Aspects; System Architecture for the 5G System; Stage 2 (Release 15)," Technical Specification 23.501, Version 1.0.0, 3GPP Organizational Partners, Jun. 2017, 146 pages.

Author Unknown, "Technical Specification Group Services and System Aspects; Architecture enhancements to facilitate communications with packet data networks and applications (Release 13)," Technical Specification 23.682, Version 13.8.0, 3GPP Organizational Partners, Dec. 2016, 93 pages.

Author Unknown, "Technical Specification Group Services and System Aspects; Architecture enhancements to facilitate communications with packet data networks and applications (Release 14)," Technical Specification 23.682, Version 14.3.0, 3GPP Organizational Partners, Mar. 2017, 106 pages.

Author Unknown, "Technical Specification Group Services and System Aspects; Architecture enhancements to facilitate communications with packet data networks and applications (Release 15)," Technical Specification 23.682, Version 15.1.0, 3GPP Organizational Partners, Jun. 2017, 118 pages.

International Search Report and Written Opinion for International Patent Application No. PCT/IB2017/053513, dated Feb. 22, 2018, 17 pages.

Written Opinion for International Patent Application No. PCT/IB2017/053513, dated May 9, 2019, 6 pages.

International Preliminary Report on Patentability for International Patent Application No. PCT/IB2017/053513, dated Aug. 5, 2019, 61 pages.

* cited by examiner

SYSTEMS AND METHODS FOR OPTIMIZED SIGNALING FOR NON IP DATA DELIVERY (NIDD) COMMUNICATION

This application is a 35 U.S.C. § 371 national phase filing of International Application No. PCT/IB2017/053513, filed Jun. 13, 2017, the disclosure of which is incorporated herein by reference in its entirety.

TECHNICAL FIELD

The present disclosure relates to Non-Internet Protocol (IP) Data Delivery (NIDD).

BACKGROUND

In a Third Generation Partnership Project (3GPP) system, the end-to-end communications between a Machine Type Communication (MTC) Application in a User Equipment device (UE) and a MTC application in an external network uses services provided by the 3GPP system including services provided by a Services Capability Server (SCS). Different models of communication are foreseen for MTC traffic between an Application Server (AS) and a UE. One model is a hybrid model where the AS connects to an operator's network for direct plane communications with the UE along with the SCS.

The SCS is an entity that operates to communicate with UEs used for MTC and/or a Service Capability Exposure Function (SCEF) in the Home Public Land Mobile Network (HPLMN). The SCS offers capabilities for use by one or multiple MTC applications. A UE can host one or multiple MTC applications. The corresponding MTC applications in the external network are hosted on one or multiple ASs.

The SCEF is the key entity within the 3GPP system for service capability exposure that provides a means to securely expose the services and capabilities provided by 3GPP network interfaces (see, e.g., 3GPP Technical Specification (TS) 23.682). When the SCEF belongs to a trusted business partner of the HPLMN, it is still seen as an HPLMN entity by other HPLMN or Visited Public Land Mobile Network (VPLMN) functional entities invoked by the SCEF (e.g., Home Subscriber Service (HSS), Mobility Management Entity (MME), etc.). Applications operating in the trust domain may require only a subset of the functionalities (e.g., authentication, authorization, etc.) provided by the SCEF.

To enable massive Internet of Things (IoT) expansion, operators will need to embrace Low Power Wide Area (LPWA) technologies, such as Narrowband IoT (NB-IoT) or Long Term Evolution (LTE) Cat-M1/M2 (for IoT and NB-IoT, respectively). IoT devices require small data transfers and 3GPP has determined that delivery via the control plane is much preferred over using the data plane. In this regard, in Release 13, 3GPP has proposed that the SCEF be used for Non-Internet Protocol (IP) Data Delivery (NIDD) as the preferred mechanism for small amounts of data to be transferred between IoT devices and ASs. 3GPP has made NIDD a requirement for small data transfers (see, e.g., 3GPP TS 23.401 V13.10.0 and 3GPP TS 23.682 V13.8.0).

SUMMARY

Systems and methods are disclosed herein that relate to deferring delivery of non-Internet Protocol (IP) data in a wireless communication system via a Non-IP Data Delivery (NIDD) procedure based on a power source status of a serving Radio Access Network (RAN) node of a target wireless device. In some embodiments, a method of operation of a network node to provide NIDD for a wireless communication system comprises receiving, from an exposure function that exposes a core network to an Application Server (AS), a NIDD request comprising data from the AS to be delivered to a wireless device via a NIDD procedure. The method further comprises making a determination as to whether to deliver the data to the wireless device via the NIDD procedure based on a power source status of a RAN node associated with the wireless device. In this manner, delivery of the non-IP data can be deferred depending on the power source status of the RAN node (e.g., deferred if the RAN node is operating on a secondary power source).

In some embodiments, making the determination as to whether to deliver the data to the wireless device via the NIDD procedure comprises making the determination to not deliver the data to the wireless device via the NIDD procedure if the power source status of the RAN node is that the RAN node is using a secondary power source, and making the determination to deliver the data to the wireless device via the NIDD procedure if the power source status of the RAN node is that the RAN node is using a primary power source.

In some embodiments, the method further comprises refraining from delivering the data to the wireless device via the NIDD procedure if the determination is made to not deliver the data to the wireless device via the NIDD procedure, and delivering the data to the wireless device via the NIDD procedure if the determination is made to deliver the data to the wireless device via the NIDD procedure.

In some embodiments, the method further comprises, if the determination is made to not deliver the data to the wireless device via the NIDD procedure, sending a request to the exposure function for retransmission of the data. In some embodiments, the request for retransmission of the data comprises an indication of a reason for the request for retransmission, the reason being that the RAN node associated with the wireless device is operating on a secondary power source.

In some embodiments, the method further comprises receiving, from the RAN node, a power source status indication that is indicative of the power source status of the RAN node. The method further comprises storing the power source status indication. Still further, making the determination as to whether to deliver the data to the wireless device via the NIDD procedure comprises making the determination as to whether to deliver the data to the wireless device via the NIDD procedure based on the stored power source status indication.

In some embodiments, the method further comprises, upon receiving the NIDD request, sending a request to the RAN node associated with the wireless device for information comprising a power source status indication that is indicative of the power source status of the RAN node and receiving the power source status indication from the RAN node. Further, making the determination as to whether to deliver the data to the wireless device via the NIDD procedure comprises making the determination as to whether to deliver the data to the wireless device via the NIDD procedure based on the received power source status indication.

In some embodiments, making the determination as to whether to deliver the data to the wireless device via the NIDD procedure comprises making the determination as to whether to deliver the data to the wireless device via the NIDD procedure based on the power source status of the RAN node associated with the wireless device and one or more additional criteria. In some embodiments, the NIDD request comprises a priority indication that indicates a priority assigned to the data, and the one or more additional criteria comprise a criterion based on the priority indication. In some other embodiments, the NIDD request comprises an override indication, and the one or more additional criteria comprise a criterion that the data is to be delivered if the override indication is set regardless of the power source status of the RAN node.

Embodiments of a network node for providing NIDD in a wireless communication system are also disclosed. In some embodiments, a network node for providing NIDD in a wireless communication system is adapted to receive, from an exposure function that exposes a core network to an AS, a NIDD request comprising data from the AS to be delivered to a wireless device via a NIDD procedure. The network node is further adapted to make a determination as to whether to deliver the data to the wireless device via the NIDD procedure based on a power source status of a RAN node associated with the wireless device. In some embodiments, the network node is further adapted to operate according to any other of the embodiments of the method of operation of the network node disclosed herein.

In some embodiments, a network node for providing NIDD in a wireless communication system comprises a network interface and circuitry associated with the network interface operable to receive, from an exposure function that exposes a core network to an AS, a NIDD request comprising data from the AS to be delivered to a wireless device via a NIDD procedure and make a determination as to whether to deliver the data to the wireless device via the NIDD procedure based on a power source status of a RAN node associated with the wireless device.

In some embodiments, in order to make the determination as to whether to deliver the data to the wireless device via the NIDD procedure, the circuitry is further operable to make the determination to not deliver the data to the wireless device via the NIDD procedure if the power source status of the RAN node is that the RAN node is using a secondary power source and make the determination to deliver the data to the wireless device via the NIDD procedure if the power source status of the RAN node is that the RAN node is using a primary power source.

In some embodiments, the circuitry is further operable to refrain from delivering the data to the wireless device via the NIDD procedure if the determination is made to not deliver the data to the wireless device via the NIDD procedure and deliver the data to the wireless device via the NIDD procedure if the determination is made to deliver the data to the wireless device via the NIDD procedure.

In some embodiments, the circuitry is further operable to, if the determination is made to not deliver the data to the wireless device via the NIDD procedure, send a request to the exposure function for retransmission of the data. In some embodiments, the request for retransmission of the data comprises an indication of a reason for the request for retransmission, the reason being that the RAN node associated with the wireless device is operating on a secondary power source.

In some embodiments, the circuitry is further operable to receive, from the RAN node, a power source status indication that is indicative of the power source status of the RAN node, store the power source status indication, and make the determination as to whether to deliver the data to the wireless device via the NIDD procedure based on the stored power source status indication.

In some embodiments, the circuitry is further operable to, upon receiving the NIDD request, send a request to the RAN node associated with the wireless device for information comprising a power source status indication that is indicative of the power source status of the RAN node, receive the power source status indication from the RAN node, and make the determination as to whether to deliver the data to the wireless device via the NIDD procedure based on the received power source status indication.

In some embodiments, the circuitry is further operable to make the determination as to whether to deliver the data to the wireless device via the NIDD procedure based on the power source status of the RAN node associated with the wireless device and one or more additional criteria. In some embodiments, the NIDD request comprises an override indication that indicates that the data is to be delivered immediately, and the one or more additional criteria comprise a criterion that the data is to be delivered if the override indication is set regardless of the power source status of the RAN node.

In some embodiments, a network node for providing NIDD in a wireless communication system comprises a receiving module and a determining module. The receiving module is operable to receive, from an exposure function that exposes a core network to an AS, a NIDD request comprising data from the AS to be delivered to a wireless device via a NIDD procedure. The determining module is operable to make a determination as to whether to deliver the data to the wireless device via the NIDD procedure based on a power source status of a RAN node associated with the wireless device.

Embodiments of a method of operation of a network node to provide an exposure function for a core network of a wireless communication system are also disclosed. In some embodiments, a method of operation of a network node to provide an exposure function for a core network of a wireless communication system comprises receiving, from an AS, data to be delivered to a wireless device via a NIDD procedure; sending, to a core network node, a first NIDD request comprising the data; receiving, from the core network node, a message that indicates that the network node did not deliver the data; storing the data; and, subsequent to receiving the message from the core network node, sending a second NIDD request comprising the data to the core network node.

In some embodiments, the message comprises an indication that the data was not delivered due to a power source status of a RAN node associated with the wireless device.

In some embodiments, the message comprises an indication that the data was not delivered because a RAN node associated with the wireless device is using a secondary power source.

In some embodiments, the second NIDD request comprises an override indication that indicates that the data is to be delivered immediately.

In some embodiments, the second NIDD request comprises an override indication that indicates that the data is to be delivered regardless of the power source status of the RAN node associated with the wireless device.

In some embodiments, the first and/or second NIDD request comprises a priority indication that indicates a priority assigned to the data.

Embodiments of a network node for providing an exposure function for a core network of a wireless communication system are also disclosed. In some embodiments, a network node for providing an exposure function for a core network of a wireless communication system is adapted to receive, from an AS, data to be delivered to a wireless device via a NIDD procedure; send, to a core network node, a first NIDD request comprising the data; receive, from the core network node, a message that indicates that the network node did not deliver the data; store the data; and, subsequent to receiving the message from the core network node, send a second NIDD request comprising the data to the core network node.

In some embodiments, a network node for providing an exposure function for a core network of a wireless communication system comprises a network interface and circuitry associated with the network interface operable to: receive, from an AS, data to be delivered to a wireless device via a NIDD procedure; send, to a core network node, a first NIDD request comprising the data; receive, from the core network node, a message that indicates that the network node did not deliver the data; store the data; and, subsequent to receiving the message from the core network node, send a second NIDD request comprising the data to the core network node.

In some embodiments, the message comprises an indication that the data was not delivered due to a power source status of a RAN node associated with the wireless device.

In some embodiments, the message comprises an indication that the data was not delivered because a RAN node associated with the wireless device is using a secondary power source.

In some embodiments, the second NIDD request comprises an override indication that indicates that the data is to be delivered immediately.

In some embodiments, the second NIDD request comprises an override indication that indicates that the data is to be delivered regardless of the power source status of the RAN node associated with the wireless device.

In some embodiments, the first and/or second NIDD request comprises a priority indication that indicates a priority assigned to the data.

In some embodiments, a network node for providing an exposure function for a core network of a wireless communication system comprises a first receiving module, a first sending module, a second receiving module, a storing module, and a second sending module. The first receiving module is operable to receive, from an AS, data to be delivered to a wireless device via a NIDD procedure. The first sending module is operable to send, to a core network node, a first NIDD request comprising the data. The second receiving module is operable to receive, from the core network node, a message that indicates that the network node did not deliver the data. The storing module is operable to store the data. The second sending module is operable to subsequent to receiving the message from the core network node, send a second NIDD request comprising the data to the core network node.

Embodiments of a method of operation of a RAN node are also disclosed. In some embodiments, a method of operation of a RAN node comprises sending a power source status indication to a core network node, the power source status indication being indicative of a type of power source being used by the RAN node. In some embodiments, the type of power source is either a primary power source or a secondary power source. In some embodiments, sending the power source status indication to the core network node comprises sending the power source status indication to the core network node proactively. In some other embodiments, the method further comprises receiving a request from the core network node for information comprising the power source status indication, wherein sending the power source status indication to the core network node comprises sending the power source status indication to the core network node in response to the request for information.

Embodiments of a RAN node are also disclosed. In some embodiments, a RAN node is adapted to send a power source status indication to a core network node, the power source status indication being indicative of a type of power source being used by the RAN node.

In some embodiments, a RAN node comprises a network interface and circuitry associated with the network interface operable to send a power source status indication to a core network node, the power source status indication being indicative of a type of power source being used by the RAN node. In some embodiments, the type of power source is either a primary power source or a secondary power source. In some embodiments, the circuitry is further operable to send the power source status indication to the core network node proactively. In some other embodiments, the circuitry is further adapted to receive a request from the core network node for information comprising the power source status indication and send the power source status indication to the core network node in response to the request for information.

In some embodiments, a RAN node comprises a sending module operable to send a power source status indication to a core network node, the power source status indication being indicative of a type of power source being used by the RAN node.

Those skilled in the art will appreciate the scope of the present disclosure and realize additional aspects thereof after reading the following detailed description of the embodiments in association with the accompanying drawing figures.

BRIEF DESCRIPTION OF THE DRAWINGS

The accompanying drawing figures incorporated in and forming a part of this specification illustrate several aspects of the disclosure, and together with the description serve to explain the principles of the disclosure.

DETAILED DESCRIPTION

Figure 1:
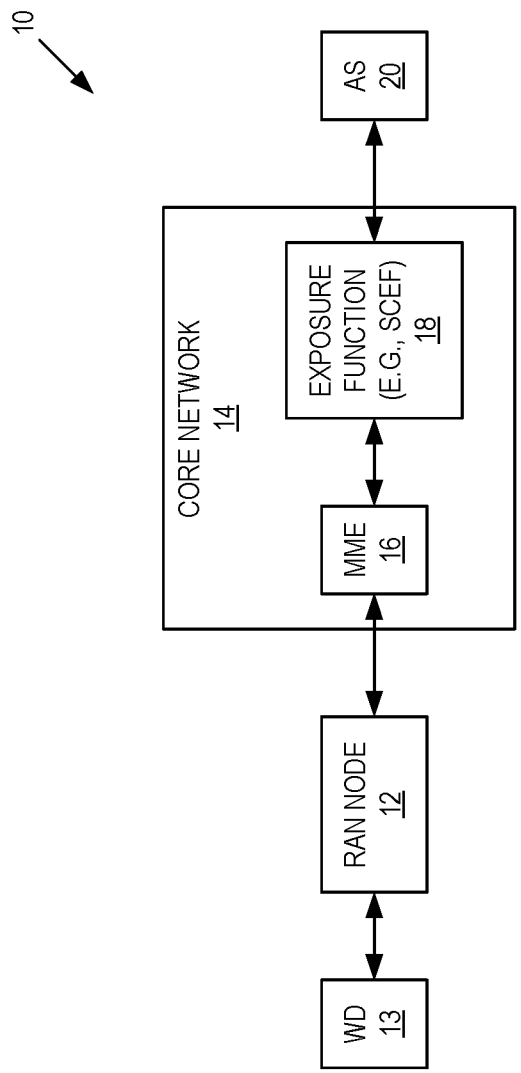
FIG. 1 illustrates one example of a wireless communication system that provides Non-Internet Protocol (IP) Data Delivery (NIDD), e.g., for Machine Type Communication (MTC) according to some embodiments of the present disclosure.

The embodiments set forth below represent information to enable those skilled in the art to practice the embodiments and illustrate the best mode of practicing the embodiments. Upon reading the following description in light of the accompanying drawing figures, those skilled in the art will understand the concepts of the disclosure and will recognize applications of these concepts not particularly addressed herein. It should be understood that these concepts and applications fall within the scope of the disclosure and the accompanying claims.

Radio Node: As used herein, a "radio node" is either a Radio Access Network (RAN) node or a wireless device.

RAN Node: As used herein, a "radio access network node" or "RAN node," which may also be referred to herein simply as a "radio access node" or "radio network node," is any node in a RAN of a cellular communications network that operates to wirelessly transmit and/or receive signals. Some examples of a RAN node include, but are not limited to, a base station (e.g., a New Radio (NR) base station (gNB) in a Third Generation Partnership Project (3GPP) Fifth Generation (5G) NR network or an enhanced or evolved Node B (eNB) in a 3GPP Long Term Evolution (LTE) network), a high-power or macro base station, a low-power base station (e.g., a micro base station, a pico base station, a home eNB, or the like), and a relay node.

Core Network Node: As used herein, a "core network node" is any type of node in a core network. Some examples of a core network node include, e.g., a Mobility Management Entity (MME), an Access Mobility Function Node in a 5G core network, a Service Capability Exposure Function (SCEF), or the like.

Wireless Device: As used herein, a "wireless device" is any type of device that has access to (i.e., is served by) a cellular communications network by wirelessly transmitting and/or receiving signals to a radio access node(s). Some examples of a wireless device include, but are not limited to, a User Equipment device (UE) in a 3GPP network and a Machine Type Communication (MTC) device.

Network Node: As used herein, a "network node" is any node that is either part of the radio access network or the core network of a cellular communications network/system.

Note that the description given herein focuses on a 3GPP cellular communications system and, as such, 3GPP terminology or terminology similar to 3GPP terminology is oftentimes used. However, the concepts disclosed herein are not limited to a 3GPP system.

Note that, in the description herein, reference may be made to the term "cell;" however, particularly with respect to 5G NR concepts, beams may be used instead of cells and, as such, it is important to note that the concepts described herein are equally applicable to both cells and beams.

The existing 3GPP architecture comprises a number of network nodes i.e., eNB, MME, Home Subscriber Service (HSS), Serving Gateway (S-GW), Packet Data Network (PDN) Gateway (P-GW), Policy and Charging Rules Function (PCRF), etc. The MTC end-to-end call flow between the UE and Application Server (AS) for Non-Internet Protocol (IP) Data Delivery (NIDD) primarily involves the UE, MME, and SCEF. The UE is the MTC UE which has embedded MTC event triggering and event data generation logic. The AS probes the MME via the SCEF and eventually reaches out to the UE for any NIDD delivery mechanism (see, e.g., 3GPP Technical Specification (TS) 23.682 V13.8.0). However, the signaling procedures for NIDD happen over the control plane of the MME, RAN, and UE and, as such, these signaling procedures are seen as an additional load over and above signaling for traditional services (i.e., voice and data). Any signaling attempts for MTC communication is seen as an additional overhead above those for data sessions.

The signaling procedures for NIDD of MTC communication are sometimes critical and sometimes non-critical in nature, i.e. contextually. If the MTC communication corresponds to smart metering, non-production event notification, etc., then the MTC communication can be seen as non-critical communication. However, there can be some critical MTC communication for NIDD such as, e.g., emergency messages related to, e.g., natural disasters, SOS related healthcare messages, traffic monitoring networks, etc.

When using the 3GPP RAN network, MTC NIDD messages depend on the eNB for paging and UE triggering mechanisms. For an operator, it is cheaper in terms of Operating Expenditure (OPEX) when the eNB is running on a primary power source (i.e., connected to the power grid). Hence, it is viable to transmit and/or receive non-critical MTC NIDD messages when the eNB is operating on a primary power source. However, in some countries or geographical regions (e.g., India), there are many areas where power from the power grid is off quite frequently (e.g., two to five hours per day). When the eNB is not operating on its primary power source, the eNB is operated on a secondary power source (e.g., battery backup using a diesel generator). This leads to very high OPEX when power from the power grid is off and, as such, it is preferable to defer non-critical communication until the eNB is again operating on its primary power source. When the eNB is operating on its secondary power source, signaling priority is given to traditional voice/data sessions and critical NIDD communication considering they are of the nature of immediate revenue realization. There is a need for systems and methods that embed the intelligence in the 3GPP network to gain knowledge of these details and to act accordingly.

Systems and methods are disclosed herein that address this need by including intelligence for a wireless communication system to understand the power source of a RAN node and decide whether to deliver NIDD messages (e.g., non-critical MTC messages, e.g., for basic MTC use cases) or defer delivery until a later time (e.g., delay delivery until the RAN node is operating on a primary power source). In some examples, the wireless communication system is a 3GPP network where intelligence is included in the eNB, MME, and SCEF to understand the power source of the eNB and to decide whether to deliver NIDD messages or defer delivery until a later time (e.g., delay delivery until the eNB is operating on a primary power source). The communication session for delivering the NIDD message is contextualized at the SCEF node. Accordingly, when an eNB is incurring higher OPEX as a result operating on a secondary power source, the network (e.g., the SCEF) will store NIDD messages (e.g., non-critical MTC NIDD messages) and defer delivery until a later time (e.g., defer delivery until the eNB is connected to a primary power source). In some embodiments, the SCEF node stores the NIDD messages, e.g., in an internal cache and will retransmit the NIDD messages through the MME either when MME probes and finds that the eNB is running on a primary power source when the eNB proactively notifies the MME that it is connected to the primary source. Embodiments disclosed herein are particularly directed to Mobile Terminal (MT) data flow initiated by the AS towards the UE.

While not being limited to or by any particular advantage, some advantages of at least some of the embodiments disclosed herein are as follows. Embodiments disclosed herein give flexibility for the network operator to prioritize the signaling traffic on its core network by classifying the signaling messages based on RAN power source and hence lower OPEX. A cheaper power source for the RAN network is more suitable for relaying non-critical MTC messages across the RAN network.

Embodiments of the present disclosure use the build on 3GPP specifications for the services capability exposure feature. These embodiments catalyze the 3GPP network nodes to be more optimized for delivering Internet of Things (IoT)/Machine to Machine (M2M) use cases with minimum changes to the core network.

Various embodiments of the present disclosure are disclosed herein. In some example implementations, the network operator is able to choose from various embodiments to select one(s) that is suitable for its implementation. The operator may decide on the flow depending on various parameters including capacity, cost benefits, local location dynamics, etc.

In this regard, FIG. 1 illustrates one example of a wireless communication system 10 that provides NIDD, e.g., for MTC according to some embodiments of the present disclosure. In this example, the wireless communication system 10 is a 3GPP LTE or LTE-based system; however, the present disclosure is not limited thereto. For example, the embodiments disclosed herein are also applicable to 5G NR, and 5G core network. Note that the names given to the various network nodes described herein are for 3GPP LTE, but different names may be used in other types of networks.

As illustrated, the wireless communication system 10 includes a RAN node 12 (e.g., an eNB) that provides radio access to a wireless device 13 (e.g., a UE). The RAN node 12 is connected to a core network 14, which includes a number of core network nodes. These core network nodes include, in this example, a MME 16 and an exposure function 18 (e.g., a SCEF). The exposure function 18 provides access to the core network 14 to one or more ASs 20, e.g., via a set of Application Program Interface (APIs).

Figure 2A:
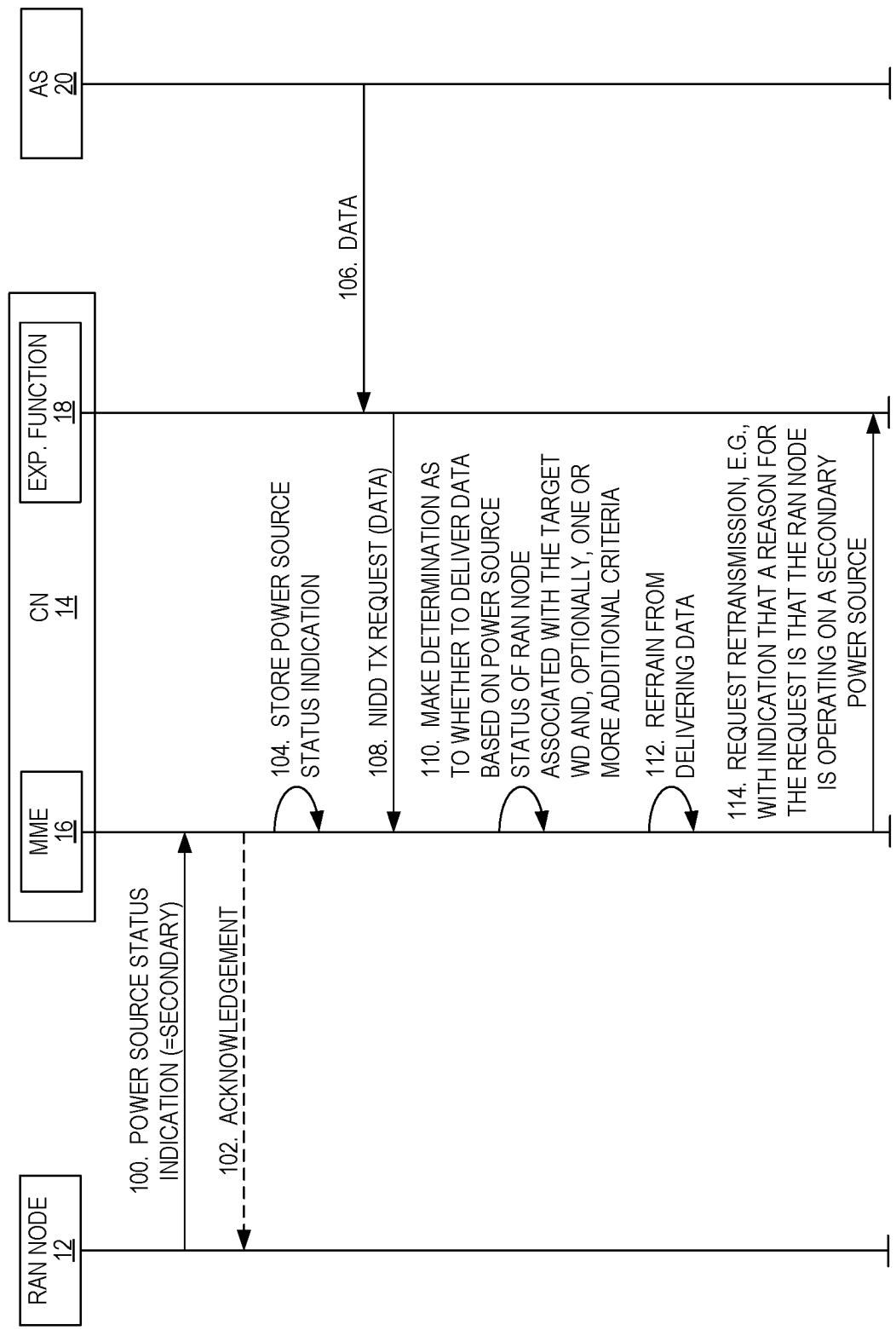
FIGS. 2A and 2B illustrate the operation of the wireless communication system of FIG. 1 in which the Radio Access Network (RAN) node proactively notifies the core network of a power source status of the RAN node and the core network uses the power source status to determine whether to defer delivery of NIDD communication according to some embodiments of the present disclosure.
Figure 2B:
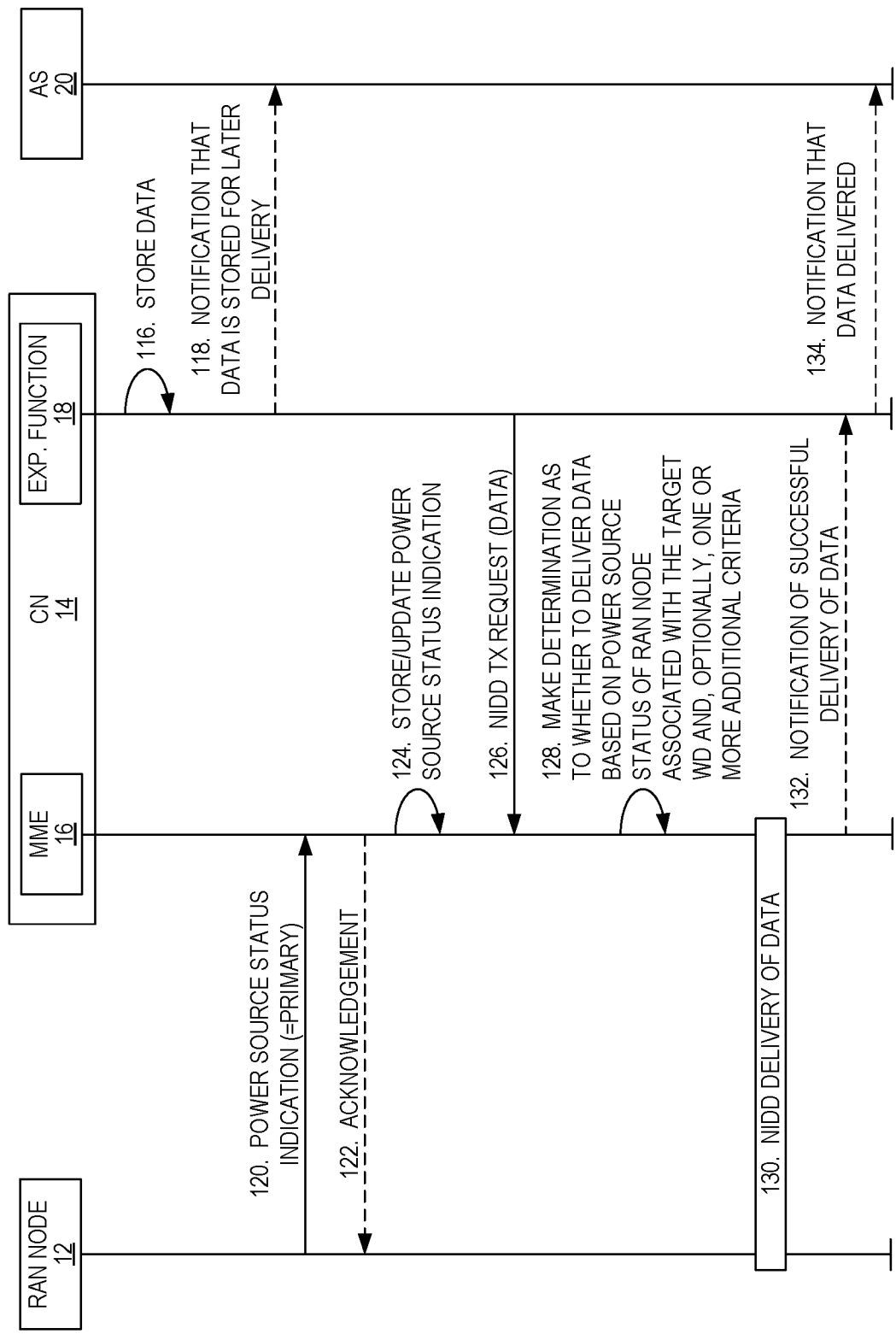

FIGS. 2A and 2B illustrate the operation of the wireless communication system 10 of FIG. 1 according to some embodiments of the present disclosure. As illustrated, the RAN node 12 proactively sends a power source status indication to the core network 14 (step 100). In this particular example, the RAN node 12 sends the power source status indication to the MME 16. In general, the power source status indication is an indication of a type of power source on which the RAN node 12 is operating. In the embodiments described herein, the power source is either a primary power source (e.g., the power grid) or a secondary power source (e.g., a battery backup powered by a generator). In this example, the RAN node 12 is operating on a secondary power source and, as such, the power source status indication is set to a value that indicates that the RAN node 12 is operating on a secondary power source. Optionally, the MME 16 responds with an acknowledgment message to thereby acknowledge receipt of the power source status indication from the RAN node 12 (step 102). The MME 16 stores the power source status indication received from the RAN node 12 (step 104).

Subsequently, the AS 20 sends a NIDD request to the core network 14 including non-IP data (i.e., data to be delivered via NIDD) to be delivered to the wireless device 13 (step 106). In this particular example, the AS 20 sends the NIDD delivery request, and thus the non-IP data, to the exposure function 18. The exposure function 18 then sends a NIDD transmit request including the non-IP data to the MME 16 (step 108). Upon receiving the NIDD transmit request, the MME 16 makes a determination as to whether to deliver the non-IP data based on a power source status of the RAN node 12 associated with the wireless device 13 to which the non-IP data is to be delivered and, optionally, one or more additional criteria (step 110). The power source status of the RAN node 12 is indicated by the power source status indication received from the RAN node 12 in step 100 and stored by the MME 16 in step 104.

In some embodiments, the MME 16 makes the determination to not deliver the non-IP data to the wireless device 13 if the power source status of the RAN node 12 is that the RAN node 12 is operating on, or using, a secondary power source, as indicated by the stored power source status indication. Conversely, the MME 16 makes the determination to deliver the non-IP data to the wireless device 13 if the power source status of the RAN node 12 is that the RAN node 12 is operating on, or using, a primary power source, as indicated by the stored power source status indication.

In addition to the power source status of the RAN node 12, the MME 16 may optionally take one or more criteria into consideration. For example, in some embodiments, the MME 16 also takes into consideration a priority assigned to the non-IP data (e.g., is the non-IP data critical or non-critical). In some embodiments, if the non-IP data has a high priority, the MME 16 may decide to deliver the non-IP data even if the RAN node 12 is operating on a secondary power source. The priority of the non-IP data may, for example, be indicated in the NIDD transmit request. As another example, the MME 16 also takes into account whether it has received an override indication from the exposure function 18. The exposure function 18 may, for example, provide an override indication in the NIDD transmit request or otherwise in association with the NIDD transmit request. If the override indication is set, the MME 16 decides to deliver the non-IP data immediately or regardless of the power source status of the RAN node 12. The exposure function 18 may decide to set the override indication based on any suitable parameter such as, for example, a priority of the non-IP data which may, as an example, be assigned by the AS 20, a maximum delivery delay which may, as an example, be assigned by the AS 20 such that delivery of the non-IP data may be delayed by no more than the maximum delivery delay, or the like.

In this example, the MME 16 makes the determination to not deliver the non-IP data. Upon making the determination to not deliver the non-IP data to the wireless device 13, the MME 16 refrains from delivering the non-IP data (step 112) and sends a retransmission request to the exposure function 18 (step 114). The retransmission request serves as an indication to the exposure function 18 that delivery of the non-IP data has been deferred and that the exposure function 18 should re-attempt delivery at a later time. In some embodiments, the retransmission request includes an indication of a reason that the non-IP data was not delivered, which in this example is set to a value that indicates that the non-IP data was not delivered due to the power source status of the RAN node 12. The reason may more specifically indicate that the reason for not delivering the non-IP data is that the RAN node 12 is operating on a secondary power source.

The exposure function 18 stores the non-IP data, e.g., locally at the exposure function 18 (step 116). Optionally, the exposure function 18 sends a notification to the AS 20 that informs the AS 20 that delivery of the non-IP data has been deferred until a later time (step 118). The process continues in this manner.

Sometime thereafter, the RAN node 12 switches operation from the secondary power source to the primary power source and sends a new power source status indication to the core network 14 (step 120). Again, in this particular example, the RAN node 12 sends the power source status indication to the MME 16. Since the RAN node 12 is now operating on the primary power source, the power source status indication in step 120 is set to a value that indicates that the RAN node 12 is operating on the primary power source. Optionally, the MME 16 responds with an acknowledgment message to thereby acknowledge receipt of the power source status indication from the RAN node 12 (step 122). The MME 16 stores the power source status indication received from the RAN node 12 (step 124).

Sometime thereafter, the MME 16 receives a NIDD transmission request including the non-IP data from the exposure function 18 (step 126). Upon receiving the NIDD transmit request from the exposure function 18 in step 126, the MME 16 again makes a determination as to whether to deliver the non-IP data based on the power source status of the RAN node 12 associated with the wireless device 13 to which the non-IP data is to be delivered and, optionally, one or more additional criteria, as discussed above (step 128). Now, the power source status of the RAN node 12 is indicated by the new power source status indication received from the RAN node 12 in step 120 and stored by the MME 16 in step 124.

In this example, the MME 16 makes the determination to deliver the non-IP data, e.g., since the RAN node 12 is now operating on the primary power source. Upon making the determination to deliver the non-IP data to the wireless device 13, the MME 16 communicates with the RAN node 12 to perform NIDD delivery of the non-IP data using a suitable NIDD delivery procedure (e.g., using the NIDD procedure defined in 3GPP TS 23.682 V14.3.0) (step 130). Optionally, the MME 16 sends a notification of successful delivery of the non-IP data to the exposure function 18 (step 132), and the exposure function 18 then sends a notification to the AS 20 that the non-IP data was delivered (step 134).

Figure 3A:
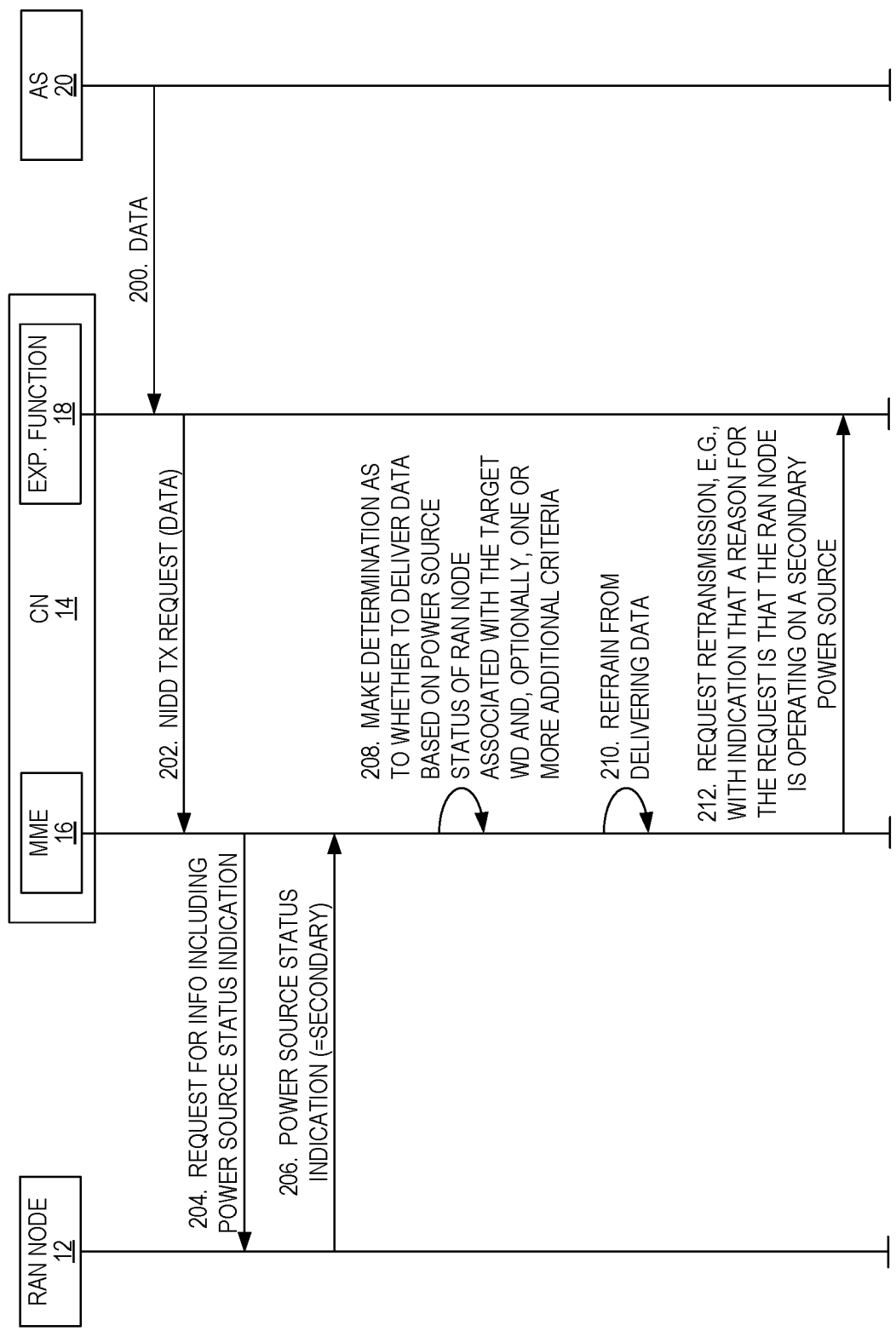
FIGS. 3A and 3B illustrate the operation of the wireless communication system of FIG. 1 in which the core network obtains the power source status of the RAN node reactively and uses the power source status to determine whether to defer delivery of NIDD communication according to some embodiments of the present disclosure.
Figure 3B:
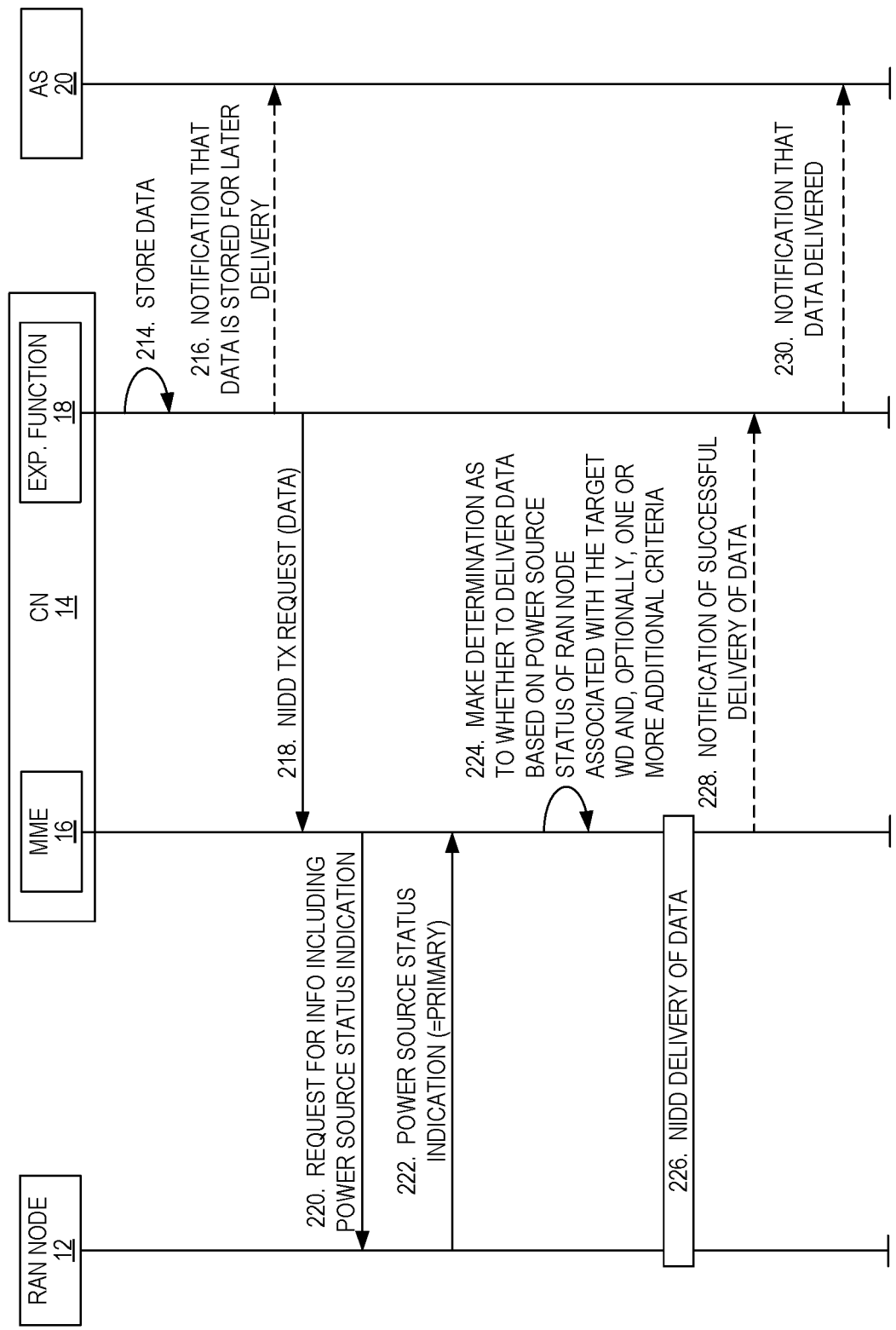

FIGS. 3A and 3B illustrate the operation of the wireless communication system 10 of FIG. 1 according to some embodiments of the present disclosure. This process is similar to that of FIGS. 2A and 2B but where the core network 14 requests the power source status indication from the RAN node 12.

The AS 20 sends a NIDD request to the core network 14 including non-IP data (i.e., data to be delivered via NIDD) to be delivered to the wireless device 13 (step 200). In this particular example, the AS 20 sends the NIDD delivery request, and thus the non-IP data, to the exposure function 18. The exposure function 18 then sends a NIDD transmit request including the non-IP data to the MME 16 (step 202). Upon receiving the NIDD transmit request, the MME 16 sends a request to the RAN node 12 associated with the wireless device 13 for information including a power source status indication (step 204). Upon receiving the request, the RAN node 12 sends a power source status indication to the core network 14 (step 206). In this particular example, the RAN node 12 sends the power source status indication to the MME 16. As discussed above, in general, the power source status indication is an indication of a type of power source on which the RAN node 12 is operating. In the embodiments described herein, the power source is either a primary power source (e.g., the power grid) or a secondary power source (e.g., a battery backup powered by a generator). In this example, the RAN node 12 is operating on a secondary power source and, as such, the power source status indication is set to a value that indicates that the RAN node 12 is operating on a secondary power source.

Upon receiving the power source status indication from the RAN node 12, the MME 16 makes a determination as to whether to deliver the non-IP data based on a power source status of the RAN node 12 associated with the wireless device 13 to which the non-IP data is to be delivered and, optionally, one or more additional criteria (step 208). The power source status of the RAN node 12 is indicated by the power source status indication received from the RAN node 12 in step 206.

As discussed above, in some embodiments, the MME 16 makes the determination to not deliver the non-IP data to the wireless device 13 if the power source status of the RAN node 12 is that the RAN node 12 is operating on, or using, a secondary power source, as indicated by the stored power source status indication. Conversely, the MME 16 makes the determination to deliver the non-IP data to the wireless device 13 if the power source status of the RAN node 12 is that the RAN node 12 is operating on, or using, a primary power source, as indicated by the stored power source status indication.

In addition to the power source status of the RAN node 12, the MME 16 may optionally take one or more criteria into consideration. For example, in some embodiments, the MME 16 also takes into consideration a priority assigned to the non-IP data (e.g., is the non-IP data critical or non-critical). In some embodiments, if the non-IP data has a high priority, the MME 16 may decide to deliver the non-IP data even if the RAN node 12 is operating on a secondary power source. The priority of the non-IP data may, for example, be indicated in the NIDD transmit request. As another example, the MME 16 also takes into account whether it has received an override indication from the exposure function 18. The exposure function 18 may, for example, provide an override indication in the NIDD transmit request or otherwise in association with the NIDD transmit request. If the override indication is set, the MME 16 decides to deliver the non-IP data immediately or regardless of the power source status of the RAN node 12. The exposure function 18 may decide to set the override indication based on any suitable parameter such as, for example, a priority of the non-IP data which may, as an example, be assigned by the AS 20, a maximum delivery delay which may, as an example, be assigned by the AS 20 such that delivery of the non-IP data may be delayed by no more than the maximum delivery delay, or the like.

In this example, the MME 16 makes the determination to not deliver the non-IP data. Upon making the determination to not deliver the non-IP data to the wireless device 13, the MME 16 refrains from delivering the non-IP data (step 210) and sends a retransmission request to the exposure function 18 (step 212). The retransmission request serves as an indication to the exposure function 18 that delivery of the non-IP data has been deferred and that the exposure function 18 should re-attempt delivery at a later time. In some embodiments, the retransmission request includes an indication of a reason that the non-IP data was not delivered, which in this example is set to a value that indicates that the non-IP data was not delivered due to the power source status of the RAN node 12. The reason may more specifically indicate that the reason for not delivering the non-IP data is that the RAN node 12 is operating on a secondary power source.

The exposure function 18 stores the non-IP data, e.g., locally at the exposure function 18 (step 214). Optionally, the exposure function 18 sends a notification to the AS 20 that informs the AS 20 that delivery of the non-IP data has been deferred until a later time (step 216). The process continues in this manner.

Sometime thereafter, the exposure function 18 sends and the MME 16 receives a NIDD transmission request including the non-IP data (step 218). For instance, upon receiving the retransmission request in step 212 and storing the non-IP data in step 214, the exposure function 18 may periodically send NIDD transmission requests to the MME 18 for the non-IP data until the non-IP data is delivered or, e.g., some other condition is met (e.g., the AS 20 cancels delivery, a maximum delay has expired, or the like).

Upon receiving the NIDD transmit request from the exposure function 18 in step 218, the MME 16 again sends a request to the RAN node 12 associated with the wireless device 13 for information including a power source status indication (step 220). Upon receiving the request, the RAN node 12 sends a power source status indication to the core network 14 (step 222). In this example, the RAN node 12 is now operating on the primary power source and, as such, the power source status indication sent to the MME 16 in step 222 is set to a value that indicates that the RAN node 12 is operating on the primary power source.

The MME 16 again makes a determination as to whether to deliver the non-IP data based on the power source status of the RAN node 12 associated with the wireless device 13 to which the non-IP data is to be delivered and, optionally, one or more additional criteria, as discussed above (step 224). The power source status of the RAN node 12 is indicated by the new power source status indication received from the RAN node 12 in step 222.

In this example, the MME 16 makes the determination to deliver the non-IP data, e.g., since the RAN node 12 is now operating on the primary power source. Upon making the determination to deliver the non-IP data to the wireless device 13, the MME 16 communicates with the RAN node 12 to perform NIDD delivery of the non-IP data using a suitable NIDD delivery procedure (e.g., using the NIDD procedure defined in 3GPP TS 23.682 V14.3.0) (step 226). Optionally, the MME 16 sends a notification of successful delivery of the non-IP data to the exposure function 18 (step 228), and the exposure function 18 then sends a notification to the AS 20 that the non-IP data was delivered (step 230).

Examples of the processes of FIGS. 2A and 2B and FIGS. 3A and 3B will now be provided for 3GPP LTE. However, again, the embodiments disclosed herein are not limited to 3GPP LTE. In operation, the AS 20/SCEF 18 has an established NIDD service for a given wireless device 13 and has downlink non-IP data to send to the wireless device 13. After an Evolved Packet System (EPS) NIDD PDN connection is successfully established, bearer context is established and the AS 20/Services Capability Server (SCS) is authorized to send a NIDD request to the exposure function 18 (which, in this example, is an SCEF). The SCEF 18 then forwards a NIDD Submit Request (User Identity (ID), EPS Bearer ID, SCEF ID, non-IP data, SCEF Wait Time, Maximum Re-transmission time) message toward the MME 16/Serving General Packet Radio Service Support Node (SGSN) or Access and Mobility management Function (AMF) (for 5G) that is connected to a respective wireless device 13.

The MME 16/SGSN (or AMF for 5G) is made aware of the type of power source on which the RAN node 12 (which in this example is an eNB) associated with the wireless device 13 is operating. Then, the MME 16/SGSN AMF (for 5G as described in 3GPP TS 23.501) will send a NIDD Submit Response (Cause, Requested Re-Transmission Time) message towards the SCEF 18 depending on whether the eNB 12 is operating on a primary or secondary power source.

In accordance with the embodiments of FIGS. 2A and 2B and FIGS. 3A and 3B, whenever there is a change in the power source status for the eNB 12 from primary to secondary or vice versa, the eNB 12 notifies the MME 16 through the S1 interface. This notification will be similar to that of the eNB Configuration Update over S1 interface request and will be acknowledged by the MME 16. The MME 16 will store this state transition (i.e., power source status indication) of the power source of each eNB 12 in its cache database. When there is a NIDD MT delivery message (NIDD Submit Request) from the SCEF 18 towards the MME 16, the MME 16 obtains the current power supply state (i.e., the current power source status as indicated by the stored power source status indication) of the eNB 12 from its cache and sends a NIDD Submit Response message to the SCEF 18. The NIDD Submit Response message states that delivery of the non-IP data is to be re-attempted, e.g., after a particular retransmission time. The NIDD Submit Response message may also include a reason for the retransmission attempt, where the reason is that the eNB 12 is currently operating on a secondary power source. When the power supply state of the eNB 12 changes from the secondary power source to the primary power source, the eNB 12 notifies the MME 16 via a configuration update message. The MME 16 can further propagate this information back to the SCEF 18 in order to trigger the SCEF 18 to resend the non-IP data to the MME 16 for delivery. After receiving the non-IP data to be delivered from the SCEF 18, the MME 16 delivers the non-IP data to the wireless device 13 via the eNB 12. The MME 16 may send an acknowledgement back to the SCEF 18 with NIDD Submit Response stating that the non-IP data was successfully delivered to the wireless device 13.

Figure 4A:
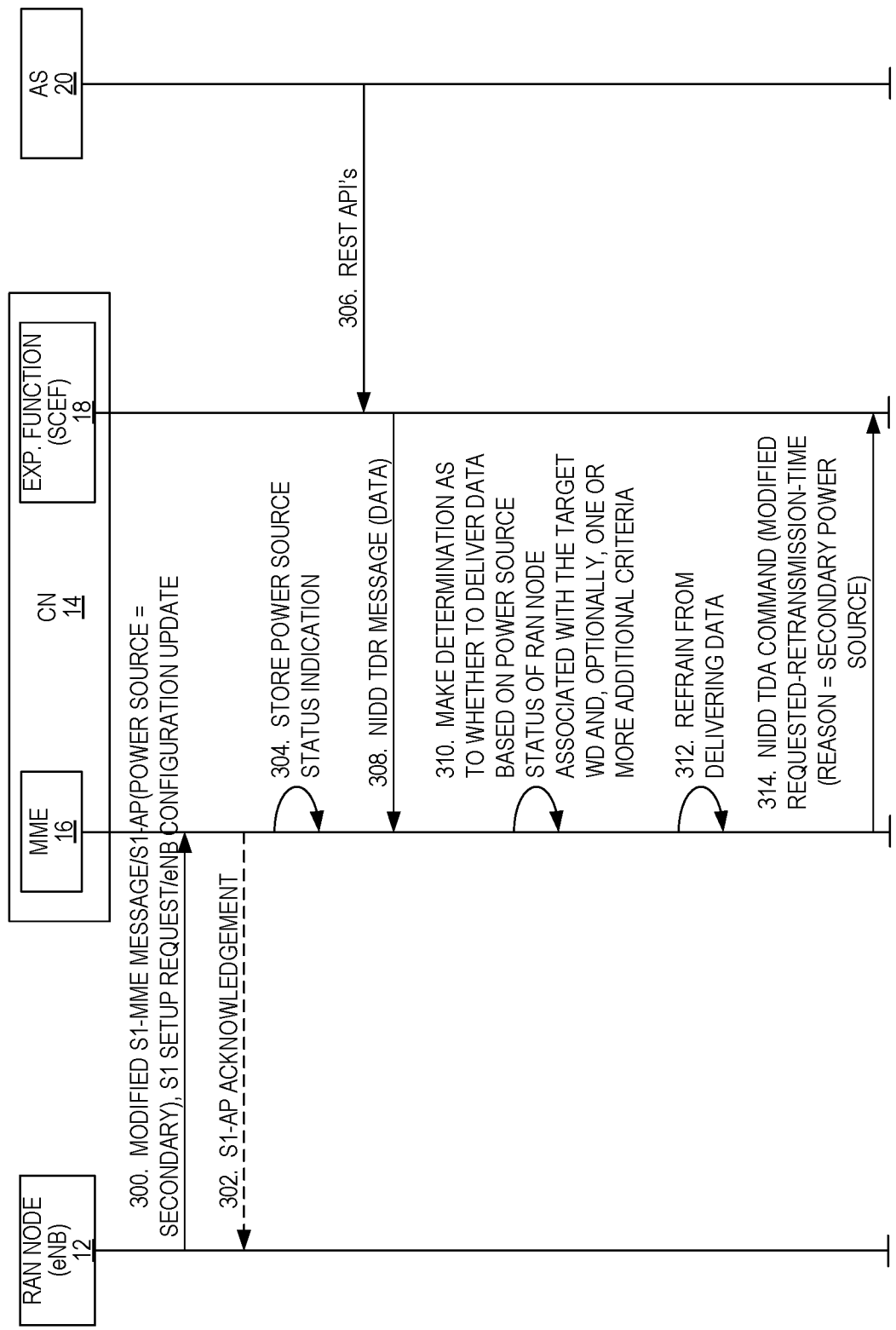
FIGS. 4A and 4B illustrate the operation of the wireless communication system in accordance with one example implementation of the embodiment of FIGS. 2A and 2B.
Figure 4B:
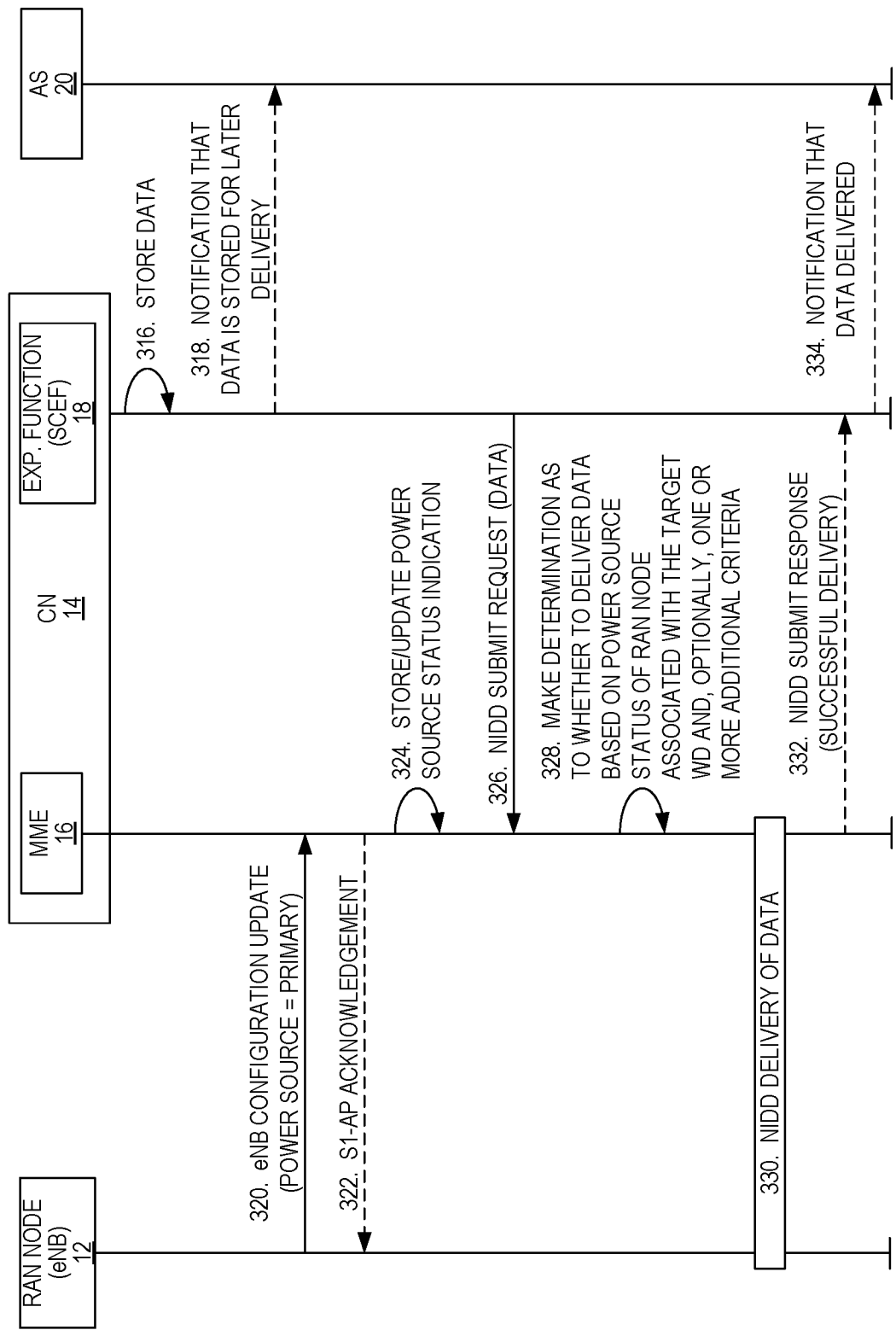

Thus, in the above example, the MME 16 stores the information regarding whether the eNB 12 is running on primary or secondary power. Additionally, the eNB 12 updates the MME 16 if and when the power source is changed. FIGS. 4A and 4B illustrate the operation of the wireless communication system 10 in accordance with this example. As illustrated, the serving eNB 12 initiates a S1 Setup Request to broadcast its configuration update message towards the MME 16 including a power source status indication that indicates that it is operating on a secondary power source (step 300). Optionally, in return, the MME 16 sends an S1AP successful acknowledgement message to the eNB 12 indicating that the MME 16 has received the power source status indication from eNB 12, where the power source status indication is indicative of the eNB's 12 current power source. The current power source status of the eNB 12 (e.g., the received power source status indication) is stored at the MME 16 (step 304).

Any further MT REST API message from the AS 20 towards the SCEF 18 is for the context of NIDD Submit Request directed towards the wireless device 13. The AS 20 sends a NIDD Submit Request (External Identifier or Mobile Subscriber Integrated Services Digital Network (MSISDN), SCS/AS Reference ID, non-IP data) message to the SCEF 18 (step 306). If an SCEF EPS bearer context corresponding to the MSISDN is established, then the SCEF 18 will send a NIDD Submit Request (User ID, EPS Bearer ID, SCEF ID, non-IP data, SCEF Wait Time, Maximum Re-transmission time) message toward the MME 16 (step 308).

The MME 16 then makes a determination as to whether to deliver the non-IP data to the wireless device 13 based on the stored current power source status of the eNB 12 associated with the wireless device 13 and, optionally, one or more additional criteria, as discussed above (step 310). Since, in this example, the eNB 12 is operating on the secondary power source, the MME 16 refrains from delivering the non-IP data (step 312) and sends an NIDD Submit Response (Cause, Requested Re-Transmission Time) message towards the SCEF 18 (step 314). The Cause parameter (also referred to herein as a reason or reason parameter) will indicate that the non-IP data was not delivered to the wireless device 13 because the serving eNB 12 of the wireless device 13 is currently operating on a secondary power source. The SCEF 18 stores the non-IP data (step 316) and some indication that the SCEF 18 is to re-transmit a NIDD TDR message for the non-IP data towards the MME 16 at a later time. Optionally, the SCEF 18 notifies the AS 20 that the non-IP data will be re-transmitted to the MME 16 for delivery to the wireless device 13 after a defined period of time.

When the power source status of the eNB 12 changes, the eNB 12 again broadcasts a configuration update message towards the MME 16 that includes a power source status indication that is set to a value that indicates that the eNB 12 is now operating on the primary power source (step 320). Optionally, the MME 16 acknowledges receipt of the power source status indication to the eNB 12 (step 322). The MME 16 stores the current power source status (e.g., the power source status indication) at the MME 16 (step 324). Optionally, the MME 16 notifies the SCEF 18 of the change in power source status of the eNB 12 to thereby trigger the SCEF 18 to retransmit the NIDD TDR message for the non-IP data. The SCEF 18 resends an NIDD Submit Request message including the non-IP data towards the MME 16 (step 326). The MME 16 makes a determination to deliver the non-IP data to the wireless device 13 based on the stored power source status of the eNB 12 and, optionally, one or more criteria (step 328). The MME 16 then pages the wireless device 13 and delivers the non-IP data to the wireless device 13 via the eNB 12 (step 330). Optionally, the MME 16 sends a NIDD Submit Response Success message towards the SCEF 18 to notify the SCEF 18 of successful delivery (step 332), and the SCEF 18 notifies the AS 20 (step 334) that the non-IP data has been delivered.

In some alternative embodiments, in accordance with the embodiment of FIGS. 3A and 3B, the MME 16 checks to see whether the eNB 12 is currently operating on the primary or secondary power source upon receiving a NIDD Submit Request message from the SCEF 18 for delivery of the non-IP data. In other words, upon receiving a NIDD Submit Request from SCEF 18 towards the MME 16, the MME 16 probes the eNB 12 on the S1 interface with a message similar to a S1 Initial Context Setup Request to obtain a power source status indication from the eNB 12. This request message directed towards eNB 12 will fetch a power source status indication from the eNB 12 that indicates whether the eNB 12 is operating on a primary or secondary power source. The eNB 12 responds to the MME 16 with a message similar to a Context Setup Response, where this message includes the power source status indication. The MME 16 then decides, based on the current power status of the eNB 12, whether to deliver the non-IP data to the wireless device 13 or defer delivery of the non-IP data by sending, to the SCEF 18, a retransmission message (NIDD Submit Response with retransmission cause and time).

Figure 5A:
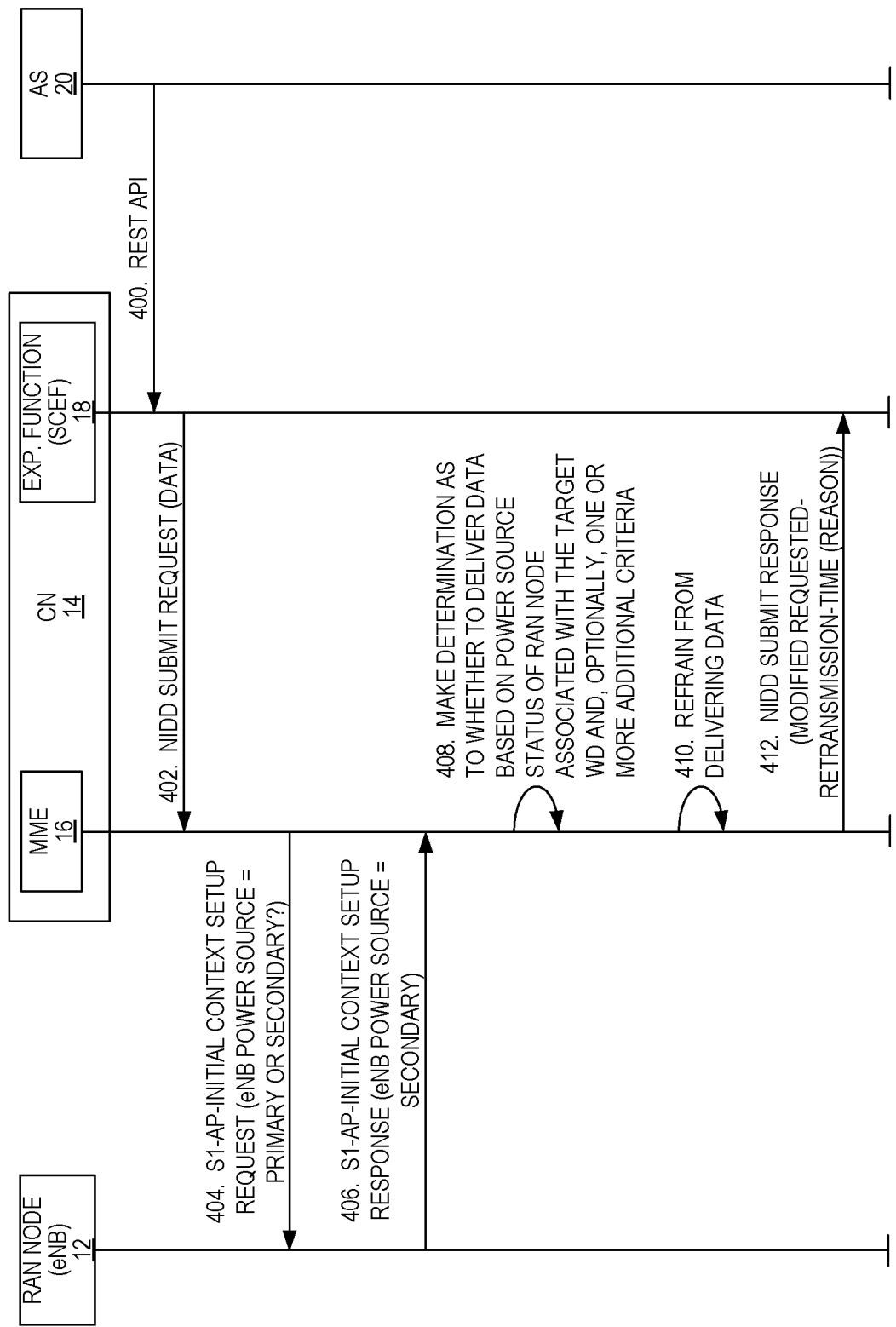
FIGS. 5A and 5B illustrate the operation of the wireless communication system in accordance with one example implementation of the embodiment of FIGS. 3A and 3B.
Figure 5B:
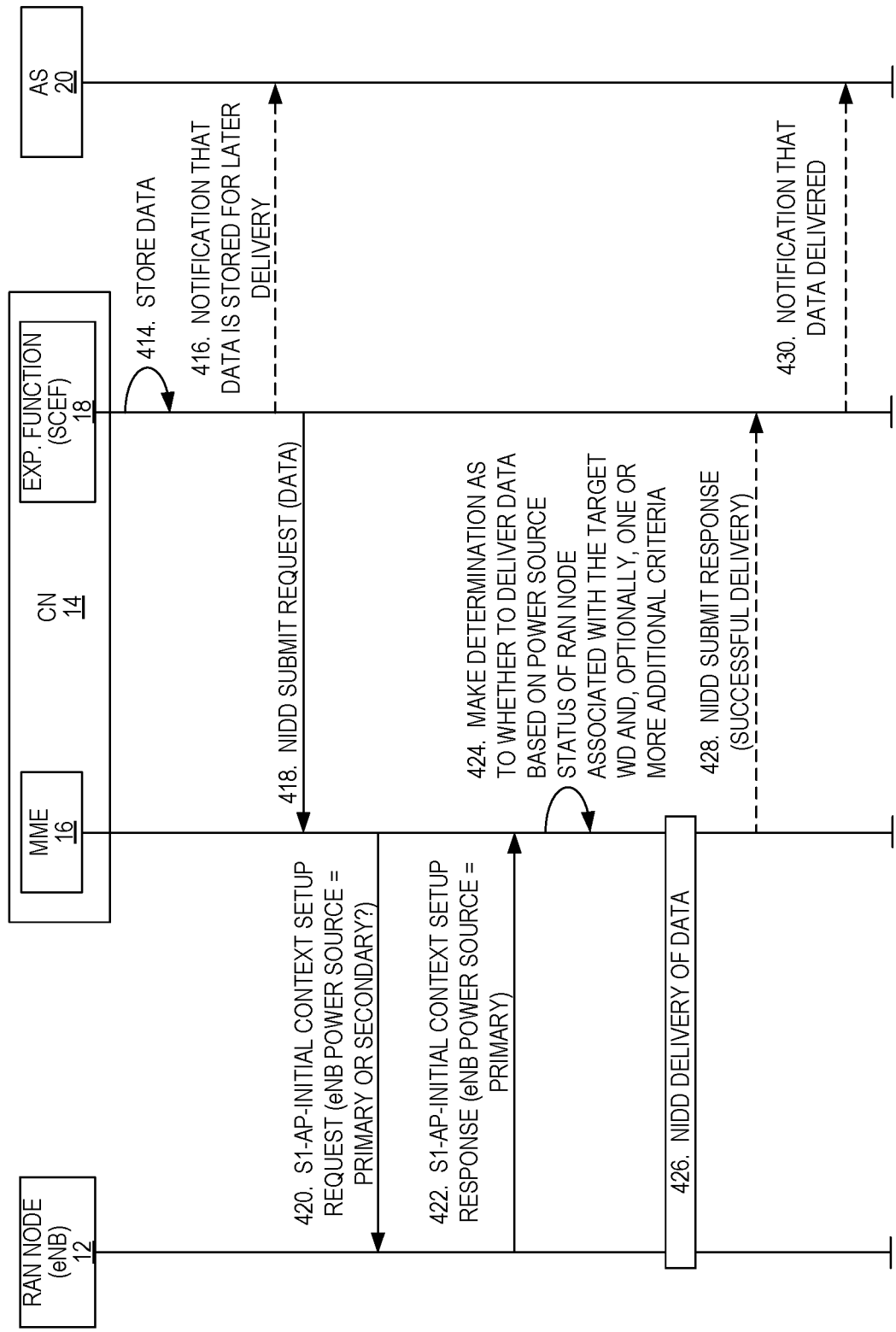

Thus, in the above example, the MME 16 checks whether the eNB 12 is running on primary or secondary power. This example is illustrated in FIGS. 5A and 5B. As illustrated, the AS 20 sends a MT REST API message towards the SCEF 18 that includes non-IP data to be delivered to the target wireless device 13 (step 400). This MT REST API message will be for the context of NIDD Submit Request directed towards the wireless device 13. The SCEF 18 sends a NIDD Submit Request (User ID, EPS Bearer ID, SCEF ID, non-IP data, SCEF Wait Time, Maximum Re-transmission time) message toward the MME 16 (step 402).

The MME 16 sends a Request Message similar to a S1AP Initial Context Setup Request asking for a power source status indication (i.e., an indication of the power source status) of the serving eNB 12 of the wireless device 13 (step 404). This message may require additional parameters indicating the eNB 12 power source details. The eNB 12 responds to the MME 16 with an S1AP Initial Context Setup Response including a power source status indication (step 406). In this example, the eNB 12 is, at this time, operating on the secondary power source and, as such, the power source status indication is set to a value that indicates that the eNB 12 is operating on the secondary power source.

The MME 16 makes a determination as to whether to deliver the non-IP data based on the current power source status of the eNB 12 and, optionally, one or more additional criteria, as discussed above (step 408). In this example, the MME 16 decides to defer delivery since the eNB 12 is operating on its secondary power source. As such, the MME 16 refrains from delivering the non-IP data to the wireless device 13 (step 410) and sends a NIDD Submit Response (Cause, Requested Re-Transmission Time) message towards the SCEF 18 (step 412). The Cause parameter, which is also referred to herein as a reason or reason parameters, indicates that the non-IP data was not delivered to the wireless device 13 because the serving eNB 12 is currently operating on its secondary power source.

The SCEF 18 stores the non-IP data (step 414) and an indication that the MME 16 has requested that the SCEF 18 re-submit the request to deliver the non-IP data at a later time. Optionally, the SCEF 18 notifies the AS 20 that delivery of the non-IP data (i.e., the NIDD message) has been deferred (step 416).

At some later time (e.g., after a re-transmission timer has expired), the SCEF 18 sends a NIDD Submit Request message including the non-IP data toward the MME 16 (step 418). The MME 16 sends a Request Message similar to a S1AP Initial Context Setup Request asking for a power source status indication (i.e., an indication of the power source status) of the serving eNB 12 of the wireless device 13 (step 420). This message may require additional parameters indicating the eNB 12 power source details. The eNB 12 responds to the MME 16 with an S1AP Initial Context Setup Response including a power source status indication (step 422). In this example, the eNB is, at this time, operating on the primary power source and, as such, the power source status indication is set to a value that indicates that the eNB 12 is operating on the primary power source.

The MME 16 makes a determination as to whether to deliver the non-IP data based on the current power source status of the eNB 12 and, optionally, one or more additional criteria, as discussed above (step 424). In this example, the MME 16 decides to deliver the non-IP data since the eNB 12 is operating on its primary power source. As such, the MME 16 pages the wireless device 13 and delivers the non-IP data to the wireless device 13 via the eNB 12 (step 426). Optionally, the MME 16 sends an NIDD Submit Response Success message towards the SCEF 18 that notifies the SCEF 18 of successful delivery (step 428), and the SCEF 18 notifies the AS 20 that the non-IP data has been delivered (step 430).

Figure 6:
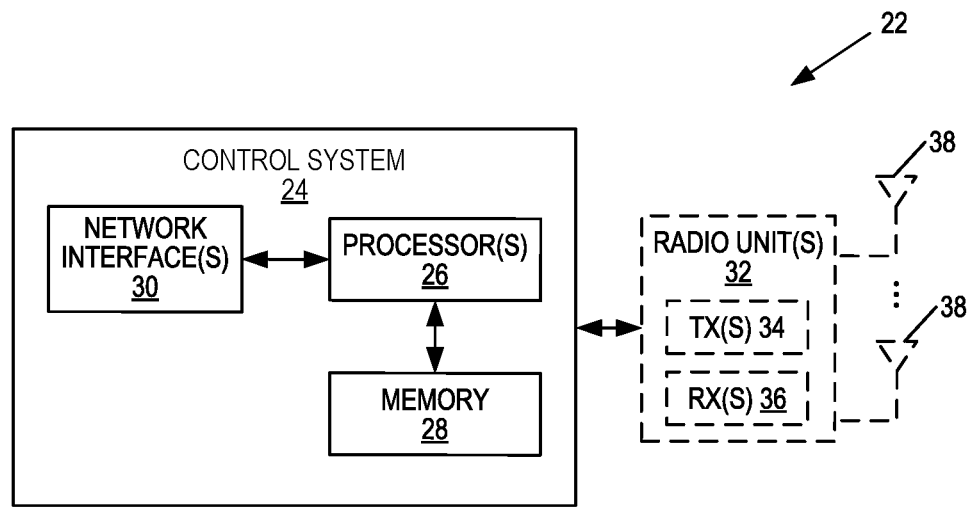
FIGS. 6 through 8 illustrate example embodiments of a network node.

FIG. 6 is a schematic block diagram of a network node 22 according to some embodiments of the present disclosure. The network 22 may be any network node including the RAN node 12, the MME 16, the exposure function 18, or the like. As illustrated, the network node 22 includes a control system 24 that includes circuitry operable to perform the functionality of the network node 22 disclosed herein. In this example, the circuitry includes one or more processors 26 (e.g., Central Processing Units (CPUs), Application Specific Integrated Circuits (ASICs), Field Programmable Gate Arrays (FPGAs), Digital Signal Processors (DSPs), and/or the like) and memory 28. The network node 22 also includes a network interface 30. If the network node 22 is the RAN node 12, the network node 22 also includes one or more radio units 32 that each includes one or more transmitters 34 and one or more receivers 36 coupled to one or more antennas 38. In some embodiments, the functionality of the network node 22 (i.e., the functionality of the RAN node 12, the MME 16, or the exposure function 18) described above may be fully or partially implemented in software that is, e.g., stored in the memory 28 and executed by the processor(s) 26.

Figure 7:
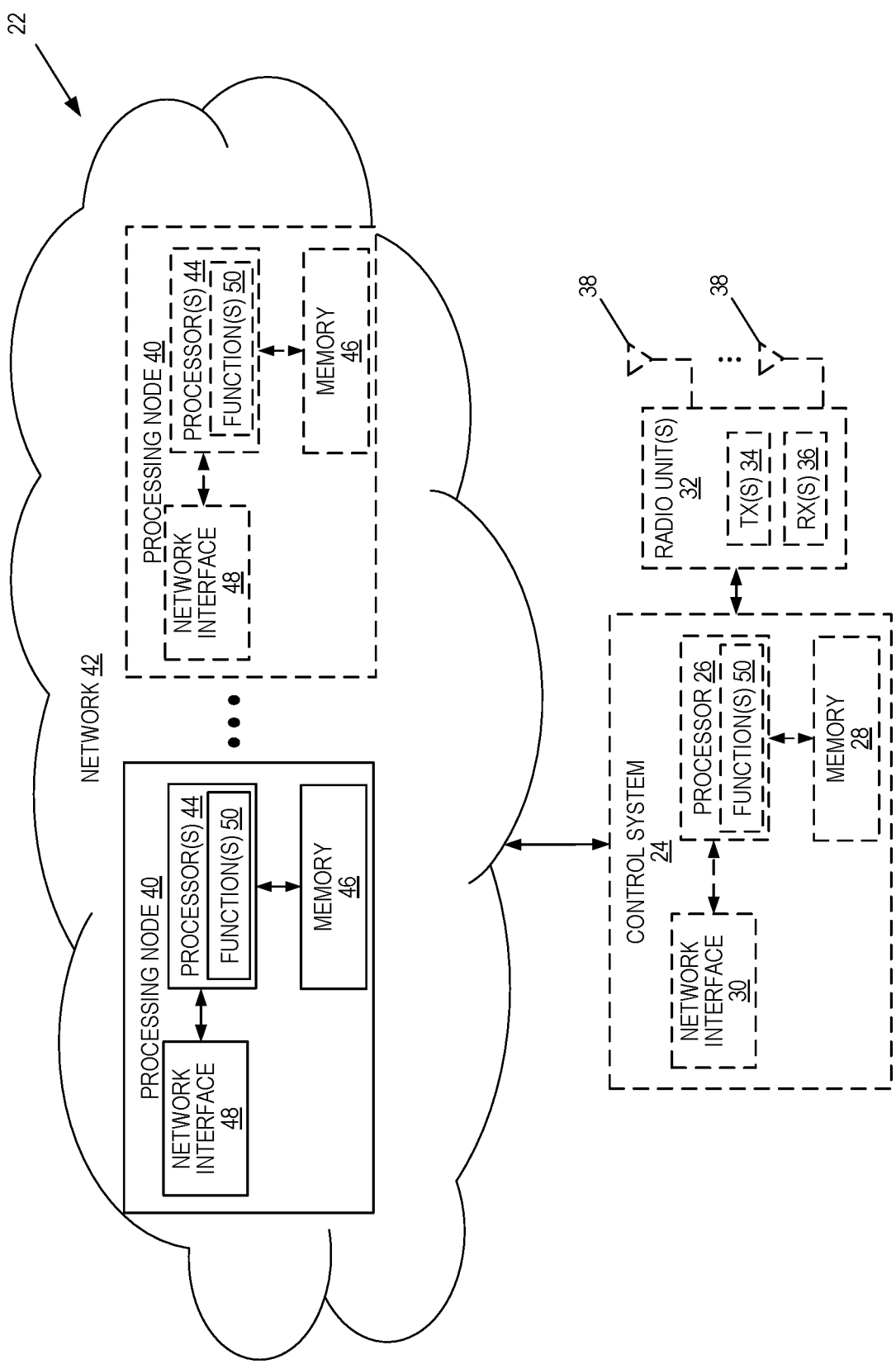

FIG. 7 is a schematic block diagram that illustrates a virtualized embodiment of the network node 22 (e.g., the RAN node 12, the MME 16, or the exposure function 18) according to some embodiments of the present disclosure. As used herein, a "virtualized" network node 22 is a network node 22 in which at least a portion of the functionality of the network node 22 is implemented as a virtual component (e.g., via a virtual machine(s) executing on a physical processing node(s) in a network(s)). As illustrated, the network node 22 optionally includes the control system 24, as described with respect to FIG. 6. In addition, if the network node 22 is the RAN node 12, the network node 22 also includes the one or more radio units 32, as described with respect to FIG. 6. The control system 24 (if present) is connected to one or more processing nodes 40 coupled to or included as part of a network(s) 42 via the network interface 30. Alternatively, if the control system 24 is not present, the one or more radio units 32 (if present) are connected to the one or more processing nodes 40 via a network interface(s). Alternatively, all of the functionality of the network node 22 (e.g., all of the functionality of the RAN node 12, the MME 16, or the exposure function 18) described herein may be implemented in the processing nodes 40. Each processing node 40 includes one or more processors 44 (e.g., CPUs, ASICs, DSPs, FPGAs, and/or the like), memory 46, and a network interface 48.

In this example, functions 50 of the network node 22 (e.g., the functions of the RAN node 12, the MME 16, or the exposure function 18) described herein are implemented at the one or more processing nodes 40 or distributed across the control system 24 (if present) and the one or more processing nodes 40 in any desired manner. In some particular embodiments, some or all of the functions 50 of the network node 22 described herein are implemented as virtual components executed by one or more virtual machines implemented in a virtual environment(s) hosted by the processing node(s) 40. As will be appreciated by one of ordinary skill in the art, additional signaling or communication between the processing node(s) 40 and the control system 24 (if present) or alternatively the radio unit(s) 32 (if present) is used in order to carry out at least some of the desired functions. Notably, in some embodiments, the control system 24 may not be included, in which case the radio unit(s) 32 (if present) communicates directly with the processing node(s) 40 via an appropriate network interface(s).

In some particular embodiments, if the network node 22 is the RAN node 12, higher layer functionality (e.g., layer 3 and up and possibly some of layer 2 of the protocol stack) of the network node 22 may be implemented at the processing node(s) 40 as virtual components (i.e., implemented "in the cloud") whereas lower layer functionality (e.g., layer 1 and possibly some of layer 2 of the protocol stack) may be implemented in the radio unit(s) 32 and/or the control system 24.

In some embodiments, a computer program including instructions which, when executed by the at least one processor 26, 44, causes the at least one processor 26, 44 to carry out the functionality of the network node 22 or a processing node 40 according to any of the embodiments described herein is provided. In some embodiments, a carrier containing the aforementioned computer program product is provided. The carrier is one of an electronic signal, an optical signal, a radio signal, or a computer readable storage medium (e.g., a non-transitory computer readable medium such as the memory 28, 46).

Figure 8:
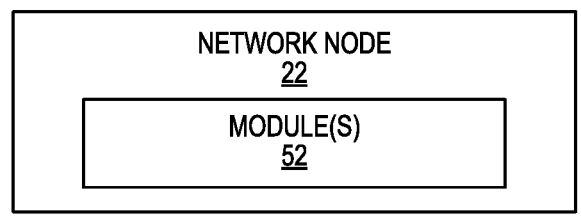

FIG. 8 is a schematic block diagram of the network node 22 according to some other embodiments of the present disclosure. The network node 22 includes one or more modules 52, each of which is implemented in software. The module(s) 52 provide the functionality of the network node 22 described herein.

For example, if the network node 22 is the RAN node 12, the module(s) 52 include a receiving module (optional) for receiving a request from the core network 14, as discussed above, and a sending module operable to send a power source status indication to a core network node (e.g., the MME 16), the power source status indication being indicative of a type of power source being used by the RAN node 12.

As another example, if the network node 22 is the MME 16, the module(s) 52 include a receiving module and a determining module. The receiving module is operable to receive, from the exposure function 18 that exposes a core network to the AS 20, a non-IP data delivery request comprising data from the AS 20 to be delivered to a wireless device 13 via a non-IP data delivery procedure. The determining module is operable to make a determination as to whether to deliver the data to the wireless device 13 via the non-IP data delivery procedure based on a power source status of a RAN node 12 associated with the wireless device 13.

As another example, if the network node 22 is the exposure function 18, the module(s) 52 include a first receiving module, a first sending module, a second receiving module, a storing module, and a second sending module. The first receiving module is operable to receive, from the AS 20, data to be delivered to the wireless device 13 via a non-IP data delivery procedure. The first sending module is operable to send, to a core network node (e.g., the MME 16), a first non-IP data delivery request comprising the data. The second receiving module is operable to receive, from the core network node (e.g., the MME 16), a message that indicates that the core network node did not deliver the data. The storing module is operable to store the data. The second sending module is operable to, subsequent to receiving the message from the core network node, send a second non-IP data delivery request comprising the data to the core network node.

The following acronyms are used throughout this disclosure.

3GPP Third Generation Partnership Project
5G Fifth Generation
AMF Access and Mobility Management Function
API Application Program Interface
AS Application Server
ASIC Application Specific Integrated Circuit
CPU Central Processing Unit DSP Digital Signal Processor
eNB Enhanced or Evolved Node B
EPS Evolved Packet System
FPGA Field Programmable Gate Array
gNB New Radio Base Station
HPLMN Home Public Land Mobile Network
HSS Home Subscriber Service
ID Identity
IoT Internet of Things
IP Internet Protocol
LPWA Low Power Wide Area
LTE Long Term Evolution
M2M Machine to Machine
MME Mobility Management Entity
MSISDN Mobile Subscriber Integrated Services Digital Network
MT Mobile Terminal
MTC Machine Type Communication
NB-IoT Narrowband Internet of Things
NIDD Non-Internet Protocol Data Delivery
NR New Radio
OPEX Operating Expenditure
PCRF Policy and Charging Rules Function
PDN Packet Data Network
P-GW Packet Data Network Gateway
RAN Radio Access Network
SCEF Service Capability Exposure Function
SCS Services Capability Server
SGSN Serving General Packet Radio Service Support Node
S-GW Serving Gateway
TS Technical Specification
UE User Equipment
VPLMN Visited Public Land Mobile Network Those skilled in the art will recognize improvements and modifications to the embodiments of the present disclosure. All such improvements and modifications are considered within the scope of the concepts disclosed herein and the claims that follow.

What is claimed is:

1. A method of operation of a network node to provide non-Internet Protocol, IP, data delivery for a wireless communication system, characterized in that the method comprises:
   receiving, from an exposure function that exposes a core network to an application server, a non-IP data delivery request comprising data from the application server to be delivered to a wireless device via a non-IP data delivery procedure; and
   making a determination as to whether to deliver the data to the wireless device via the non-IP data delivery procedure based on a power source status of a radio access network node associated with the wireless device and one or more additional criteria, wherein the non-IP data delivery request comprises an override indication, and the one or more additional criteria comprise a criterion that the data is to be delivered if the override indication is set regardless of the power source status of the radio access network node, and the power source status indicates whether or not the radio access network node is operating with a primary power source or a secondary power source where the radio access network node is capable of transmitting data to the wireless device regardless of whether the radio access network node is operating with the primary power source or the secondary power source.

2. The method of claim 1 wherein making the determination as to whether to deliver the data to the wireless device via the non-IP data delivery procedure comprises:
   making the determination to not deliver the data to the wireless device via the non-IP data delivery procedure if the power source status of the radio access network node is that the radio access network node is using the secondary power source; and
   making the determination to deliver the data to the wireless device via the non-IP data delivery procedure if the power source status of the radio access network node is that the radio access network node is using the primary power source.

3. The method of claim 1 further comprising:
   refraining from delivering the data to the wireless device via the non-IP data delivery procedure if the determination is made to not deliver the data to the wireless device via the non-IP data delivery procedure; and
   delivering the data to the wireless device via the non-IP data delivery procedure if the determination is made to deliver the data to the wireless device via the non-IP data delivery procedure.

4. The method of claim 3 further comprising, if the determination is made to not deliver the data to the wireless device via the non-IP data delivery procedure, sending a request to the exposure function for retransmission of the data.

5. The method of claim 4 wherein the request for retransmission of the data comprises an indication of a reason for the request for retransmission, the reason being that the radio access network node associated with the wireless device is operating on the secondary power source.

6. The method of claim 1 further comprising:
   receiving, from the radio access network node, a power source status indication that is indicative of the power source status of the radio access network node; and
   storing the power source status indication;
   wherein making the determination as to whether to deliver the data to the wireless device via the non-IP data delivery procedure comprises making the determination as to whether to deliver the data to the wireless device via the non-IP data delivery procedure based on the stored power source status indication.

7. The method of claim 1 further comprising, upon receiving the non-IP data delivery request:
   sending a request to the radio access network node associated with the wireless device for information comprising a power source status indication that is indicative of the power source status of the radio access network node; and
   receiving the power source status indication from the radio access network node;
   wherein making the determination as to whether to deliver the data to the wireless device via the non-IP data delivery procedure comprises making the determination as to whether to deliver the data to the wireless device via the non-IP data delivery procedure based on the received power source status indication.

8. The method of claim 1 wherein the non-IP data delivery request comprises a priority indication that indicates a priority assigned to the data, and the one or more additional criteria comprise a criterion based on the priority indication.

9. A network node for providing non-Internet Protocol, IP, data delivery in a wireless communication system, characterized in that the network node comprises:

a network interface; and circuitry associated with the network interface operable to:
- receive, from an exposure function that exposes a core network to an application server, a non-IP data delivery request comprising data from the application server to be delivered to a wireless device via a non-IP data delivery procedure;
- make a determination as to whether to deliver the data to the wireless device via the non-IP data delivery procedure based on a power source status of a radio access network node associated with the wireless device and one or more additional criteria, wherein the non-IP data delivery request comprises an override indication, and the one or more additional criteria comprise a criterion that the data is to be delivered if the override indication is set regardless of the power source status of the radio access network node, and the power source status indicates whether or not the radio access network node is operating with a primary power source or a secondary power source where the radio access network node is capable of transmitting data to the wireless device regardless of whether the radio access network node is operating with the primary power source or the secondary power source.

10. The network node of claim 9 wherein, in order to make the determination as to whether to deliver the data to the wireless device via the non-IP data delivery procedure, the circuitry is further operable to:
- make the determination to not deliver the data to the wireless device via the non-IP data delivery procedure if the power source status of the radio access network node is that the radio access network node is using the secondary power source; and
- make the determination to deliver the data to the wireless device via the non-IP data delivery procedure if the power source status of the radio access network node is that the radio access network node is using the primary power source.

11. The network node of claim 9 wherein the circuitry is further operable to:
- refrain from delivering the data to the wireless device via the non-IP data delivery procedure if the determination is made to not deliver the data to the wireless device via the non-IP data delivery procedure; and
- deliver the data to the wireless device via the non-IP data delivery procedure if the determination is made to deliver the data to the wireless device via the non-IP data delivery procedure.

12. The network node of claim 11 wherein the circuitry is further operable to, if the determination is made to not deliver the data to the wireless device via the non-IP data delivery procedure, send a request to the exposure function for retransmission of the data.

13. The network node of claim 12 wherein the request for retransmission of the data comprises an indication of a reason for the request for retransmission, the reason being that the radio access network node associated with the wireless device is operating on the secondary power source.

14. The network node of claim 9 wherein the circuitry is further operable to:
- receive, from the radio access network node, a power source status indication that is indicative of the power source status of the radio access network node;
- store the power source status indication; and
- make the determination as to whether to deliver the data to the wireless device via the non-IP data delivery procedure based on the stored power source status indication.

15. The network node of claim 9 wherein the circuitry is further operable to, upon receiving the non-IP data delivery request:
- send a request to the radio access network node associated with the wireless device for information comprising a power source status indication that is indicative of the power source status of the radio access network node;
- receive the power source status indication from the radio access network node; and
- make the determination as to whether to deliver the data to the wireless device via the non-IP data delivery procedure based on the received power source status indication.

16. A non-transitory computer readable medium storing instructions executable by processing circuitry of a network node whereby the network node is operable to:
- receive, from an exposure function that exposes a core network to an application server, a non-IP data delivery request comprising data from the application server to be delivered to a wireless device via a non-IP data delivery procedure; and
- making a determination as to whether to deliver the data to the wireless device via the non-IP data delivery procedure based on a power source status of a radio access network node associated with the wireless device and one or more additional criteria, wherein the non-IP data delivery request comprises an override indication, and the one or more additional criteria comprise a criterion that the data is to be delivered if the override indication is set regardless of the power source status of the radio access network node, and the power source status indicates whether or not the radio access network node is operating with a primary power source or a secondary power source where the radio access network node is capable of transmitting data to the wireless device regardless of whether the radio access network node is operating with the primary power source or the secondary power source.

* * * * *